(12) United States Patent
Han et al.

(10) Patent No.: US 7,213,538 B2
(45) Date of Patent: May 8, 2007

(54) ANIMAL RESTRAINING APPARATUS FOR PHYSIOLOGICAL AND PHARMACOLOGICAL STUDIES

(75) Inventors: Jeong Han, Galveston, TX (US); Volker Neugebauer, Galveston, TX (US)

(73) Assignee: The Board of Regents of the University of Texas System, Austin, TX (US)

(*) Notice: Subject to any disclaimer, the term of this patent is extended or adjusted under 35 U.S.C. 154(b) by 153 days.

(21) Appl. No.: 11/036,207

(22) Filed: Jan. 14, 2005

(65) Prior Publication Data

US 2005/0172913 A1 Aug. 11, 2005

Related U.S. Application Data

(60) Provisional application No. 60/536,443, filed on Jan. 14, 2004.

(51) Int. Cl.
*A01K 15/04* (2006.01)
*A01K 29/00* (2006.01)

(52) U.S. Cl. .................. 119/752; 119/417; 119/756
(58) Field of Classification Search ............. 119/751, 119/752, 753, 754, 755, 756, 757, 416, 417, 119/427; D30/158
See application file for complete search history.

(56) References Cited

U.S. PATENT DOCUMENTS

| | | | | | |
|---|---|---|---|---|---|
| 1,956,499 | A | * | 4/1934 | Dworetzky | 119/729 |
| 2,540,650 | A | * | 2/1951 | Brosene, Jr. et al. | 119/751 |
| 3,023,734 | A | * | 3/1962 | Schaub | 119/729 |
| 3,094,101 | A | * | 6/1963 | Porter | 119/752 |
| 3,138,141 | A | * | 6/1964 | Poage | 119/751 |
| 3,368,530 | A | * | 2/1968 | Bearss | 119/734 |
| 3,464,392 | A | * | 9/1969 | Hoyme et al. | 119/751 |
| 3,941,092 | A | * | 3/1976 | Winters | 119/497 |
| 4,020,796 | A | * | 5/1977 | Grifa | 119/671 |
| 4,070,989 | A | * | 1/1978 | Ganzel | 119/516 |
| 4,185,591 | A | * | 1/1980 | Patelis | 119/723 |
| 4,228,765 | A | * | 10/1980 | Berlin | 119/752 |
| 4,269,149 | A | * | 5/1981 | Thomas | 119/729 |
| 4,796,565 | A | * | 1/1989 | Charbeneau | 119/751 |
| 5,009,196 | A | * | 4/1991 | Young | 119/756 |
| D346,466 | S | * | 4/1994 | Puntervold, Sr. | D30/158 |
| 5,320,069 | A | * | 6/1994 | Anderson et al. | 119/751 |
| 5,339,772 | A | * | 8/1994 | Abell | 119/724 |
| 5,603,288 | A | * | 2/1997 | Ferber | 119/751 |
| 5,823,146 | A | * | 10/1998 | Alaniz et al. | 119/725 |
| 5,943,983 | A | * | 8/1999 | Drew et al. | 119/722 |
| 7,036,454 | B2 | * | 5/2006 | Davis et al. | 119/6.5 |
| 7,089,884 | B2 | * | 8/2006 | Wang et al. | 119/753 |

* cited by examiner

*Primary Examiner*—Yvonne R. Abbott
(74) *Attorney, Agent, or Firm*—Robert W Strozier

(57) ABSTRACT

An animal restraining apparatus is disclosed which provides head, tail, and hind leg apertures for gaining access to an animals head, tail and perianal area, and hind legs for physiological and pharmacological studies of awake animals using direct mechanical, thermal, chemical and/or pharmacological stimuli.

20 Claims, 8 Drawing Sheets

ANIMAL RESTRAINING APPARATUS FOR PHYSIOLOGICAL AND PHARMACOLOGICAL STUDIES

RELATED APPLICATIONS

This application claims provisional priority to U.S. Provisional Patent Application Ser. No. 60/536,443, filed 14 Jan. 2004.

BACKGROUND OF THE INVENTION

1. Field of the Invention

The present invention relates to an animal restraining apparatus for use in physiological and pharmacological studies.

More particularly, the present invention relates to an animal restraining apparatus for use in physiological and pharmacological studies, where the apparatus permits ready access to an animal's head, hindlimbs, tail and perianal areas of the restrained animal.

2. Description of the Related Art

Many animal restraining apparatuses have been constructed and proposed over the year. Most of these apparatuses adequately restrain the animal, but do not provide sufficient access to various areas of the animal's body to facilitate physiological and pharmacological studies, especially for awake animals.

Thus, there is a need in the art for a superior animal restraint apparatus that permits ready access of a wide variety of areas of the animal body, while the animal is awake so that various stimuli, drugs or drug responses can be monitored.

SUMMARY OF THE INVENTION

The present invention provides an improved, adjustable animal restraint apparatus, where the apparatus permits physiological and pharmacological studies of awake animals using direct mechanical, thermal, chemical and/or pharmacological stimuli. The apparatus includes a housing adapted to accommodate an awake animal and apertures designed to make accessible various portions of the animals anatomy permitting various stimuli to be applied to the accessible portions.

The present invention also provides an improved animal restraint apparatus for receiving an animal including a housing having a front panel, a back panel, two side panels, a top panel and a bottom panel. The front panel includes an aperture adapted to receive an animal's head and to make the head accessible from outside the housing, extends out past the front panel, where the aperture can be adjustable. The back panel includes an aperture through which an animal's tail can extend and through which the perianal area of the animal is accessible, where this aperture can also be adjustable. Each side panel include a groove near a bottom end there of adapted to receive the bottom panel. One side panel includes a first hinge member, while the top panel is a lid or includes a lid, where the top panel or lid portion of the top panel includes a second hinge member designed to mate with the first hinge member of the one side panel to form a hinge. The lid or top panel also includes a knob adapted to open the top panel or the lid portion of the top panel as it pivots about the hinge and optionally a locking device adapted to lock the lid. The top panel also includes one or more hooks for suspending or hanging the apparatus above a measuring and/or stimulation device. The apparatus also includes a bottom panel having hind leg apertures therein and optionally a plurality of abdominal holes therebetween. The bottom panel is adapted to slidingly engage the grooves in the side panels so that the bottom panel can be moved horizontally (in and out motion) allowing adjustment of the hind leg apertures to accommodate different animal sizes.

The present invention also provides an improved animal restraint apparatus for receiving an animal including a housing having a front panel, a back panel, two side panels, a top panel and a bottom panel. The front panel includes an aperture adapted to receive an animal's head and to make the head accessible from outside the housing, extends out past the front panel, where the aperture can be adjustable. The back panel includes an aperture through which an animal's tail can extend and through which the perianal area of the animal is accessible, where this aperture can also be adjustable. Each side panel includes a lower portion and an upper portion. The lower portion includes two parallel disposed members, an outer member and an inner member and a gap therebetween, where the gap is designed to receive the upper portion. When the upper portion is inserted into the gap of the lower portion, the fit is tight enough to resist gravity, yet still allow vertical adjustment of the apparatus. Of course, the upper portions can also include apertures and pins to hold the upper portion at a given position, or any other adjustable holding device. The inner member of the bottom portion includes a groove near a bottom end thereof for receiving a bottom panel. One side panel includes a first hinge member, while the top panel is a lid or includes a lid, where the top panel or lid portion of the top panel includes a second hinge member designed to mate with the first hinge member of the one side panel to form a hinge. The lid or top panel also includes a knob adapted to open the top panel or the lid portion of the top panel as it pivots about the hinge and optionally a locking device for locking the lid in place. The top panel also includes one or more hooks for suspending or hanging the apparatus above a measuring and/or stimulation device. The bottom panel is designed to slidingly fit inside the grooves of the side panels so that the bottom panel is horizontally (in and out) adjustable so that the position of the hind leg apertures can be adjusted relative to the front panel.

The present invention also provides an animal restraint apparatus including a housing having a front, back, right side, left side, top and bottom panel. The front panel includes an adjustable aperture adapted to receive a head of an animal. The back panel includes an adjustable aperture to receive a tail of an animal and to make its perianal area accessible from outside the housing. The left side panel includes a hinge member. The top panel includes a lid having a hinge member designed to engage the left side hinge member to form a hinge adapted to open and close the lid. The lid includes a knob for pivoting the lid about the axis of the hinge, i.e., opening and closing the lid, and optionally a locking member. The top panel also includes at least one hanging member for suspending or hanging the apparatus over a measuring and/or stimulating device. The bottom panel includes two adjustable hind leg aperture and an optional plurality of circular apertures therebetween.

The present invention also provides an animal restraint apparatus including a front panel having an aperture for receiving an animal's head so that the head can extend out past the front panel. The apparatus also includes a back panel having an aperture through which an animals tail can extend and through which the perianal area of the animal is accessible. The apparatus also includes vertically adjustable side panels and a horizontally adjustable bottom panel having adjustable, hind leg apertures or horizontally adjustable hind leg apertures. The apparatus also includes a top panel having an openable lid allowing access to an interior of the apparatus and at least one hook adapted to suspend the apparatus above a measuring and/or stimulating device.

The present invention provides method for restraining an animal including the steps of opening a lid of an apparatus of this invention. After opening the lid of the apparatus, the animal is inserted into the apparatus so that the animal's head extends through the aperture in the front panel, the animals tail extends through the aperture in the back panel, and the animal's hind legs extend through the hind leg apertures. The apparatus is then adjusted by changing the vertical and horizontal position of the bottom panel so that the size of the interior and the position of the hind leg apertures are adjusted to accommodate the animal.

The present invention provides a method for performing studies on an awake restrained animal including the steps of opening a lid of an apparatus of this invention. After opening the apparatus, the animal is inserted into the apparatus so that the animal's head extends through the aperture in the front panel, the animals tail extends through the aperture in the back panel, and the animal's hind legs extend through the hind leg apertures. The apparatus is then adjusted by changing the vertical and horizontal position of the bottom panel so that the size of the interior and the position of the hind leg apertures are adjusted to accommodate the animal. After properly adjusting the apparatus, the animal is subjected to a measurement, an administration, a stimulation or a mixture thereof to achieve a given physiologic or pharmacologic response.

DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1A:
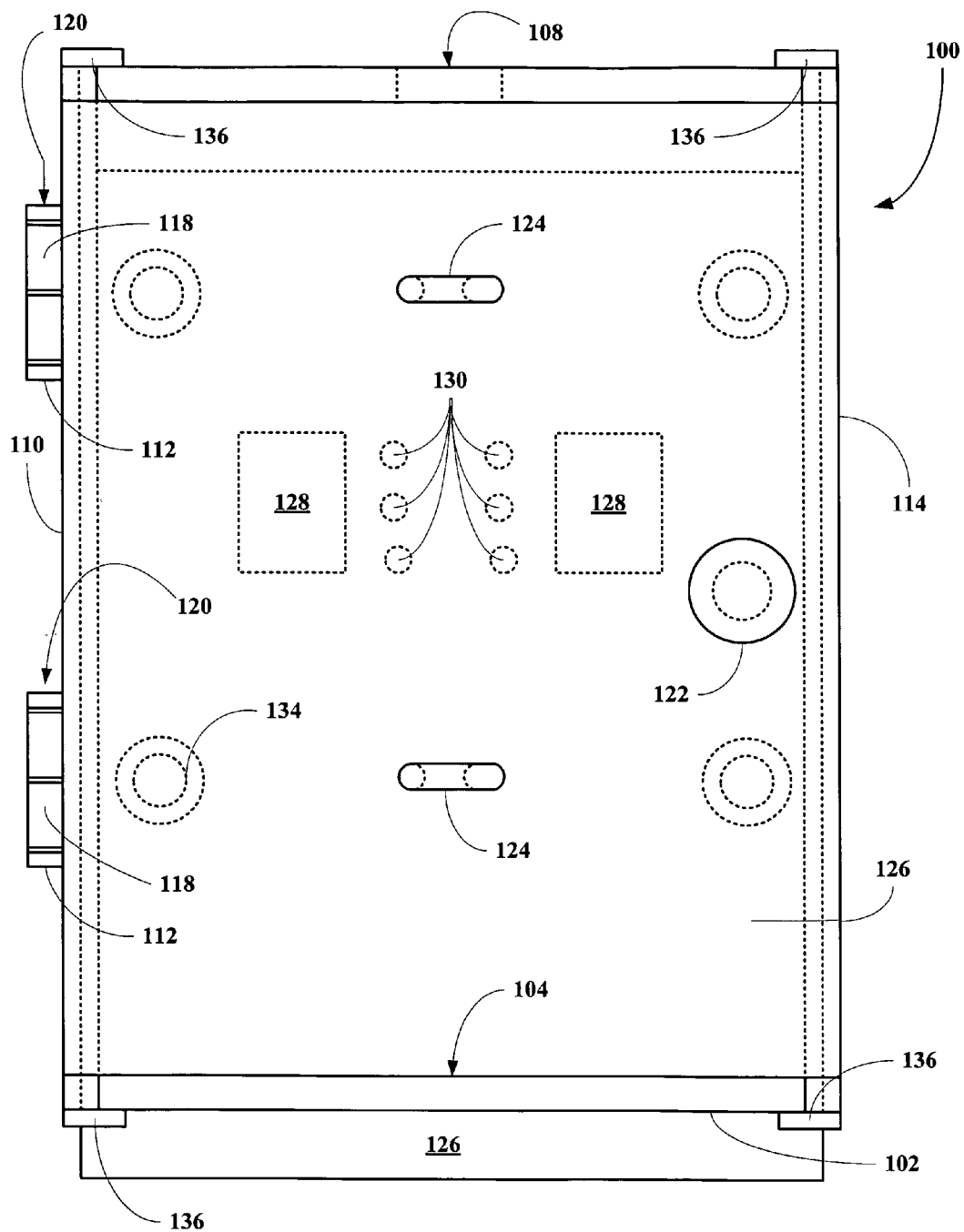
FIGS. 1A–C depict a first preferred embodiment of an apparatus of this invention.

The inventors have found that an adjustable animal restraint apparatus can be constructed that is designed to receive an animal and has apertures therein designed to make externally accessible an animal's head, an animal's hind legs, an animal's tail and perianal area where the apertures and/or the size of the apparatus an adjustable.

The body of the animal is gently restrained in the apparatus while the hind paws, head, tail, and perianal parts of the animal's body are accessible to the investigator. Each body part outside of the apparatus can be used for sensory (e.g., noxious, thermal, mechanical, chemical, etc.) and pharmacological stimulations, measurement of physiological (reflex) and behavioral (vocalization) responses and drug application (local, systemic, and intracranial).

The present invention broadly relates to an animal restraint apparatus including a front panel having a head aperture for receiving an animal's head so that the head can extend out past the front panel. The apparatus also includes a back panel having a tail aperture through which an animals tail can extend and through which the perianal area of the animal is accessible. The apparatus also includes two side panels and a vertically adjustable bottom panel having a horizontally adjustable, hind leg apertures. The apparatus also includes a top panel having an openable lid allowing access to the interior of the apparatus and at least one hook adapted to suspend the apparatus above a measuring or stimulating device.

The present invention broadly relates to method for restraining and studying an animal including the steps of inserting the animal into an apparatus of this invention is such as way that the animal's head is inserted into the head aperture, the hind legs into the hind leg apertures, and the tail into the tail aperture. The apparatus is adjusted so that the apertures adequately accommodate the animal's size. The adjusting can be down both prior to animal insertion (gross adjustment first), after animal insertion (gross and fine adjustment) or both before and after (gross adjustment before insertion and fine adjustment after insertion). After adjustment, the animal can be subject to one or more measurements, stimulations, or administrations, e.g., the animal can be given a drug and the animal's reaction to the drug can be monitored.

Although the apparatus can be constructed out of any construction material, including, without limitation, metals, plastics, ceramics, composites, or mixtures or combinations thereof. Preferred metal include iron or iron alloys such as steel, aluminum or aluminum alloys such as aluminum-magnesium alloys, copper or copper alloys such as brass or bronze, titanium, or the like or mixtures or combinations thereof. Preferred plastics include, without limitation, clear structural plastics such as plexiglass, carbonate polymers, epoxy resins, urethane resins, isotactic polypropylene, syndiotactic polypropylene, or the like or mixtures or combinations thereof. Preferred ceramics include, without limitation, formed glasses, formed aluminas, silicas, silica-aluminates, alumina-silicates, titanates, or any other structural ceramic or mixtures or combinations thereof. Preferred composites include, without limitation, laminants, carbon fiber composites, boron-nitride composites, or the like or mixture or combinations thereof. When opaque structure materials are used to construct the apparatus, the apparatus preferably includes windows made of glass or clear plastics or screens.

Figure 1B:
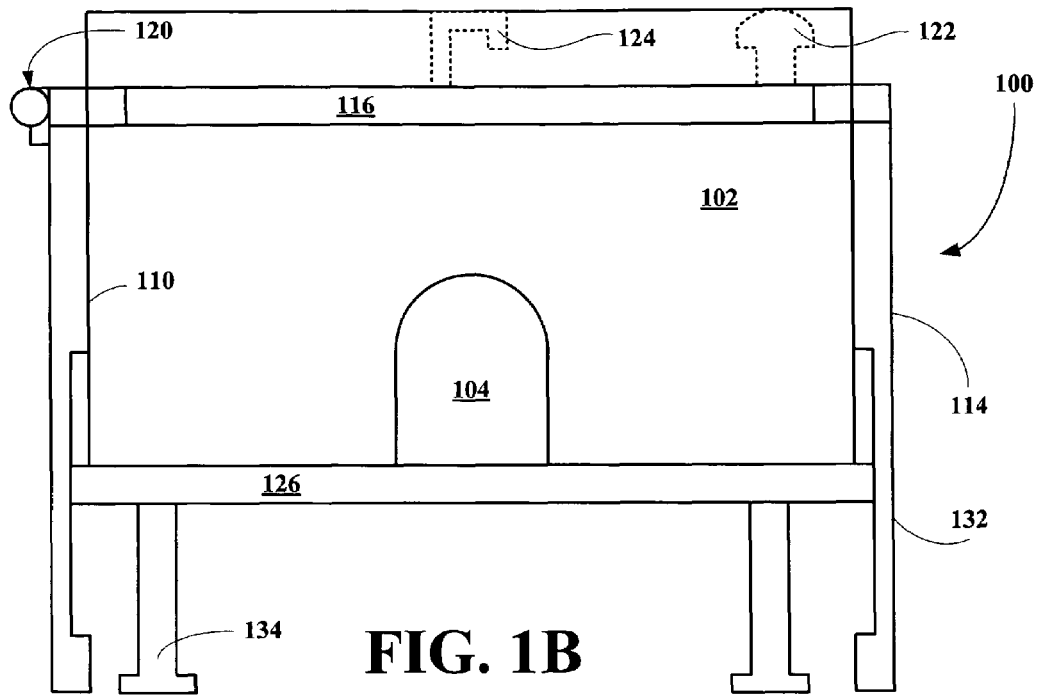
Figure 1C:
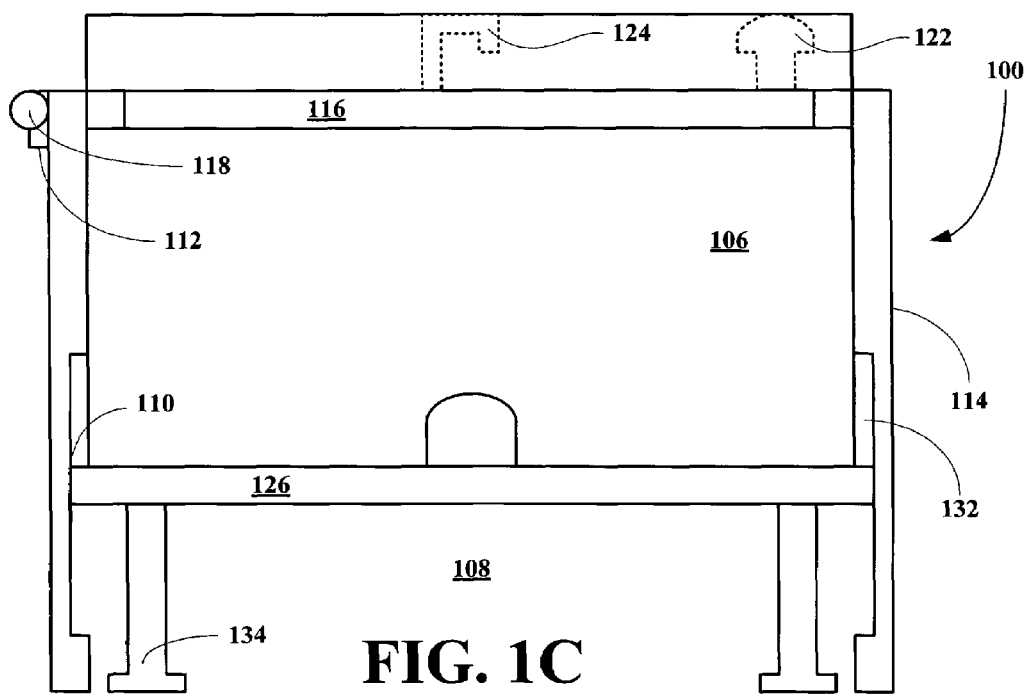

Referring now to FIG. 1A–C, a preferred embodiment of an animal restraint apparatus of this invention, generally 100, is shown to include a front panel 102 having a head aperture 104 and a back panel 106 having a tail aperture 108. The apparatus 100 also includes a left side panel 110 having first hinge members 112 and a right side panel 114. The apparatus 100 also includes a top panel 116 having second hinge members 118 adapted to mate with the first hinge member 112 to form hinge 120. The top panel 116 also includes an opener 122 and two hooks 124 adapted to hange the apparatus 100. The apparatus 100 also includes a bottom panel 126 having two hind leg apertures 128 and a plurality of abdominal apertures 130. The bottom panel 126 is designed to slidingly engage a vertical slot 132 in each of the side panels 110 and 114, where the bottom panel can be moved in and out to adjust the hind leg apertures 128. The bottom panel 126 is also designed to be moved up and down within the slot 132 via bottom panel vertical adjustment knobs 134. Moreover, the front panel 102 and the back panel 106 can slide vertically up and down to accommodate movement of the bottom panel 126 up and down as shown in FIGS. 1B&C. The panels define an animal restraint cavity and the cavity's dimension is adjusted when the bottom panel is moved up and down. The top panel 102 and the back panel 106 can be positioned in grooves in the side panels (not shown) or restrained by a lip 136.

Figure 2A:
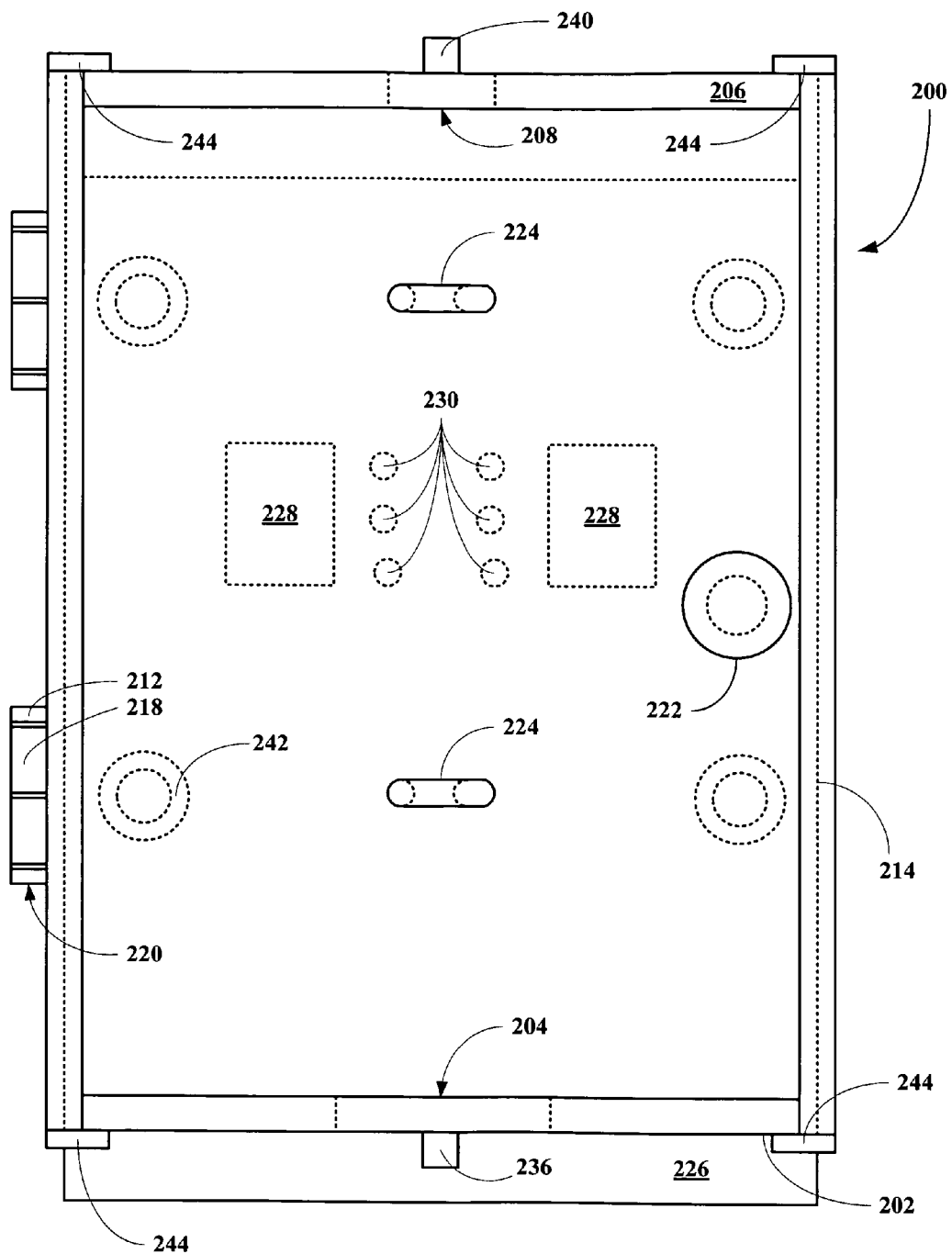
FIG. 2A–C depicts another preferred embodiment of an apparatus of this invention.
Figure 2B:
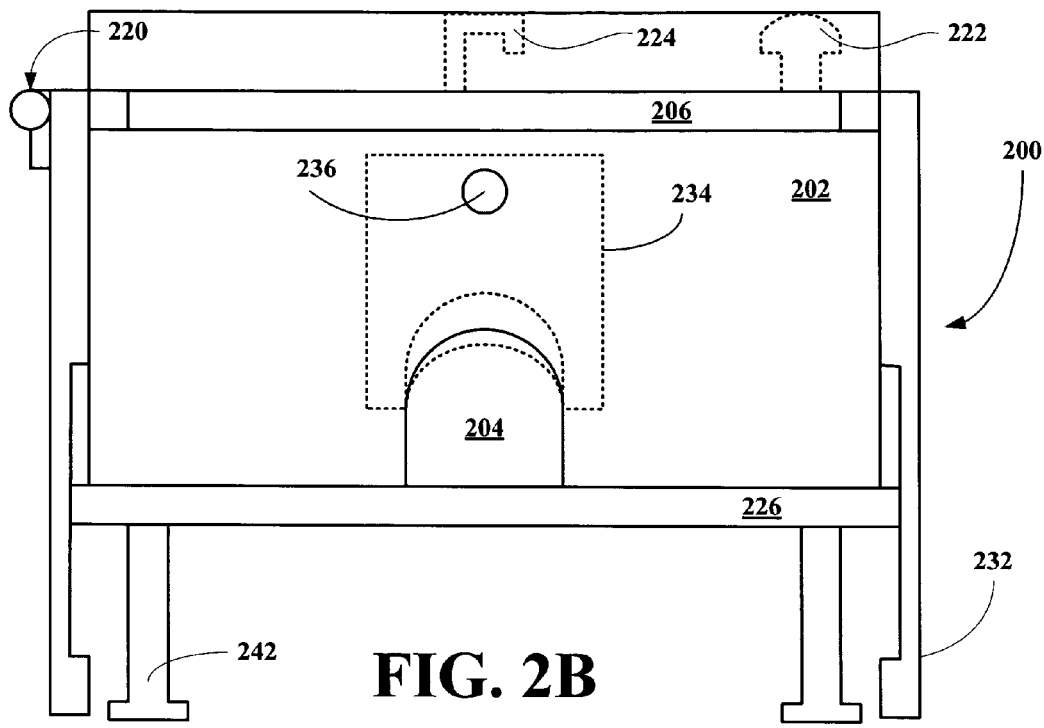
Figure 2C:
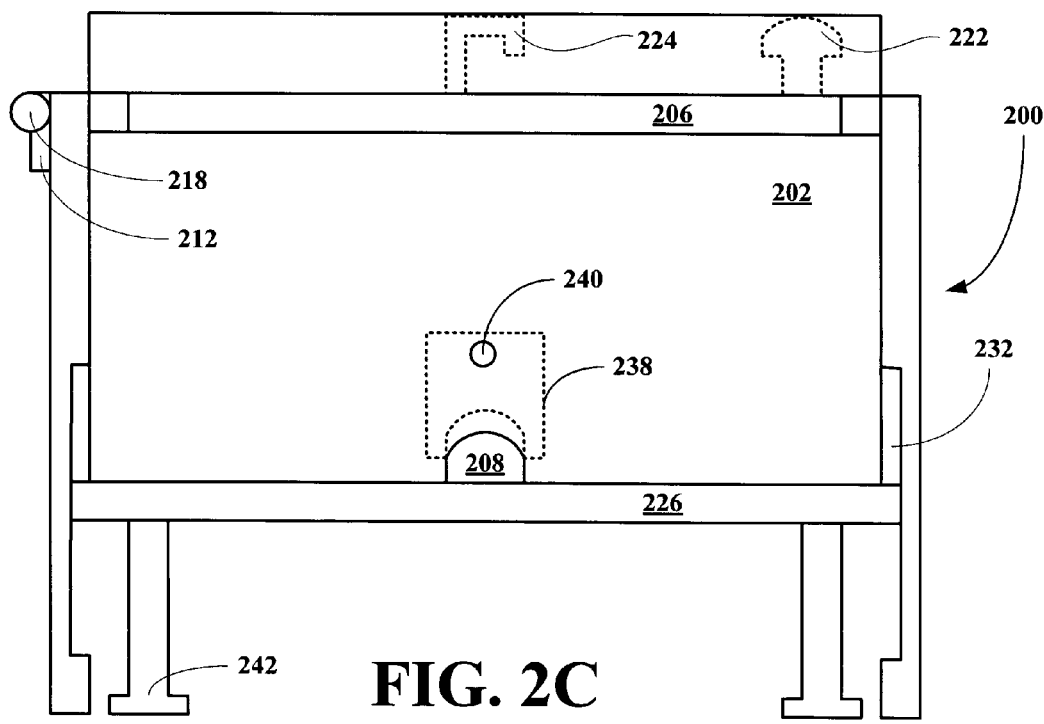

Referring now to FIG. 2A–C, another preferred embodiment of an animal restraint apparatus of this invention, generally 200, is shown to include a front panel 202 having a head aperture 204 and a back panel 206 having a tail aperture 208. The apparatus 200 also includes a left side panel 210 having a first hinge member 212 and a right side panel 214. The apparatus 200 also includes a top panel 216 having a second hinge member 218 adapted to mate with the first hinge member 212 to form hinge 220. The top panel 216 also includes an opener 222 and two hooks 224 adapted to hange the apparatus 200. The apparatus 200 also includes a bottom panel 226 having two hind leg apertures 228 and a plurality of abdominal apertures 230. The bottom panel 226 is designed to slidingly engage a vertical slot 232 in each of the side panels 210 and 214, where the bottom panel can be moved in and out to adjust the hind leg apertures 228. The head aperture 204 is adjustable by a slidable member 234 having a head aperture adjustment member 236. The tail aperture 208 is adjustable by a slidable member 238 having a tail aperture adjustment member 240. The bottom panel 226 is also designed to be moved up and down within the slot 232 via bottom panel vertical adjustment knobs 242. Moreover, the front panel 202 and the back panel 306 can slide vertically up and down to accommodate movement of the bottom panel 226 up and down as shown in FIGS. 2B&C. The panels define an animal restraint cavity and the cavity's dimension is adjusted when the bottom panel is moved up and down. The top panel 202 and the back panel 206 can be positioned in grooves in the side panels (not shown) or restrained by a lip 244.

Figure 3A:
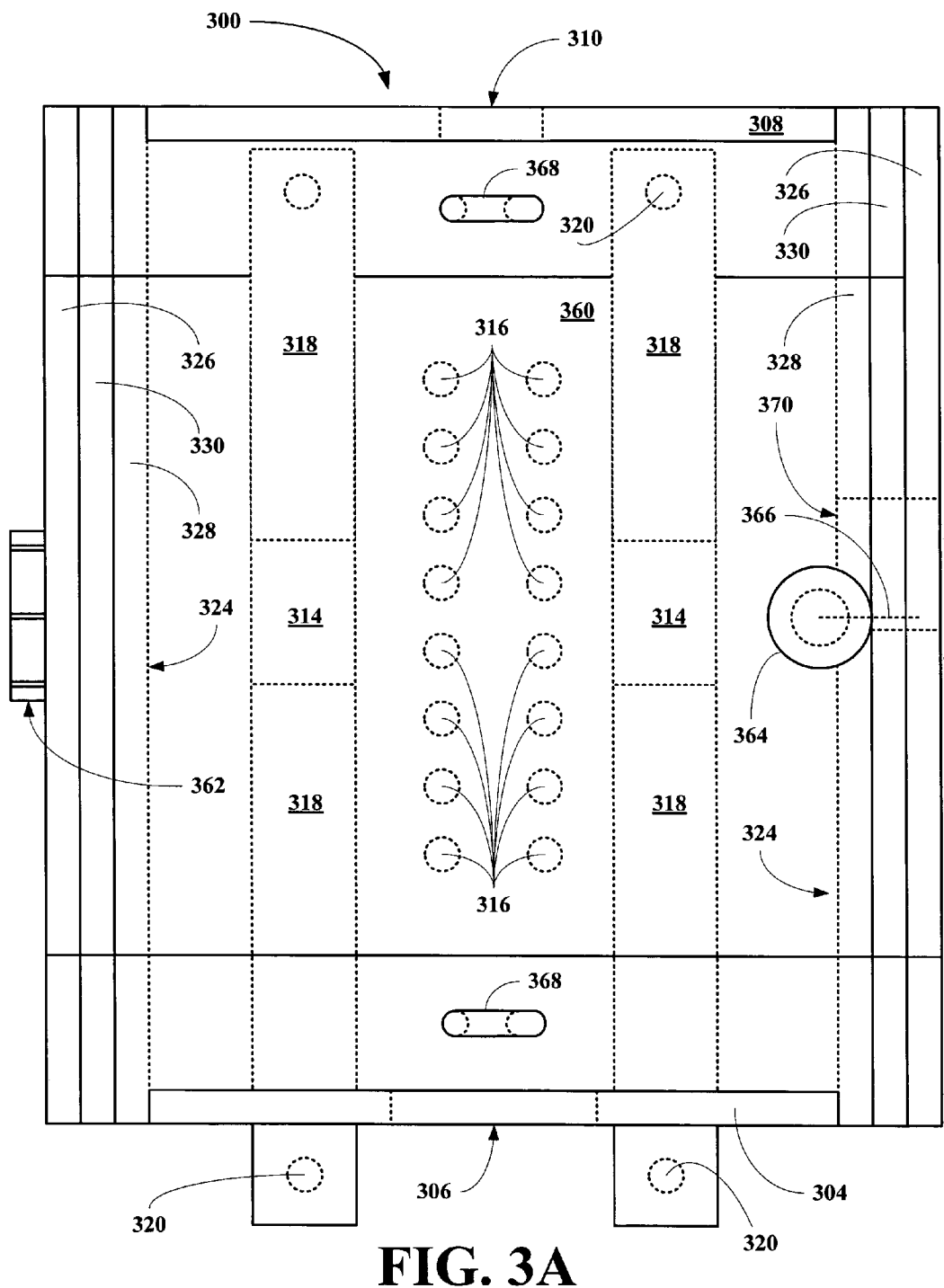
FIG. 3A–C depicts another preferred embodiment of an apparatus of this invention.
Figure 3B:
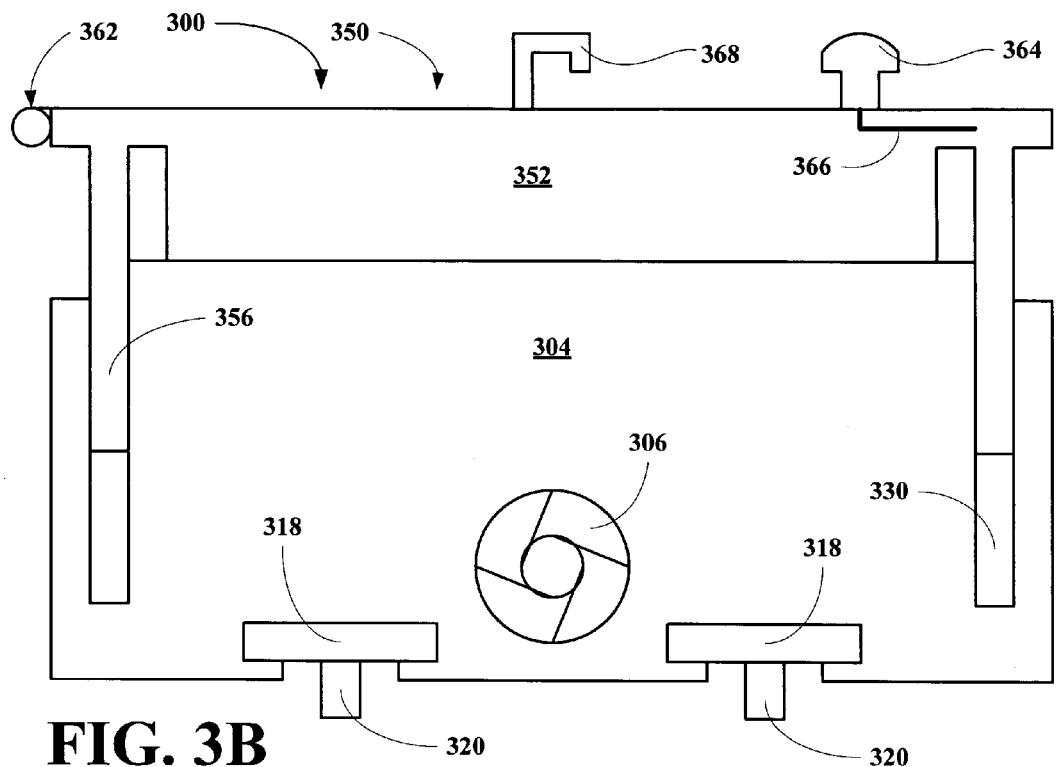
Figure 3C:
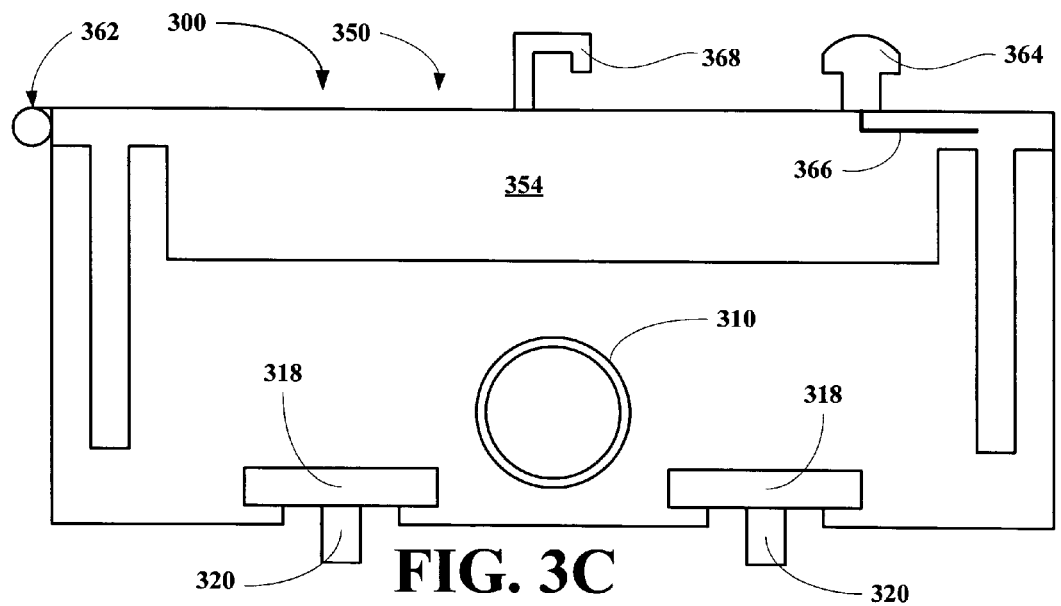

Referring now to FIG. 3A–C, another preferred embodiment of an animal restraint apparatus of this invention, generally 300, is shown to include a bottom assembly 302 and a top assembly 350.

The bottom assembly 302 includes a first front panel 304 having an adjustable diaphragm gram, head aperture 306 and a first back panel 308 having an adjustable diaphragm tail aperture 310. The bottom assembly 302 also includes a bottom panel 312 having two hind leg apertures 314, a plurality of abdominal apertures 316 and two pairs of hind leg aperture adjusting slats 318 having adjustment knobs 320, where the slats 318 are designed to travel in grooves 322 in the front panel 304 and the back panel 308 permitting both the location and the size of the apertures 314 to be adjusted. The bottom assembly 302 also includes left and right panel assemblies 324, each panel assembly 324 includes an outer lower side panel 326, an inner lower side panel 328 separated by a gap 330.

The top assembly 350 includes a second front panel 352 adapted to slide inside the first front panel 304 of the bottom assembly 302 and a second back panel 354 adapted to slide inside the first back panel 308 of the bottom assembly 302. The top assembly 350 also includes left and right panels 356 adapted to slide within the gaps 330 to adjust the height of the apparatus 300. The top assembly also includes a top panel 358 having a lid 360 having a hinge 362 and an opening knob 364 with a locking arm 366 and two hooks 368 for handing the apparatus 300 above a stimulating or measuring device not shown. The locking arm 366 moves in and out of a slot 370. The assemblies define an animal restraint cavity and the cavity's dimension is adjusted when the top assembly is moved up and down.

Figure 4A:
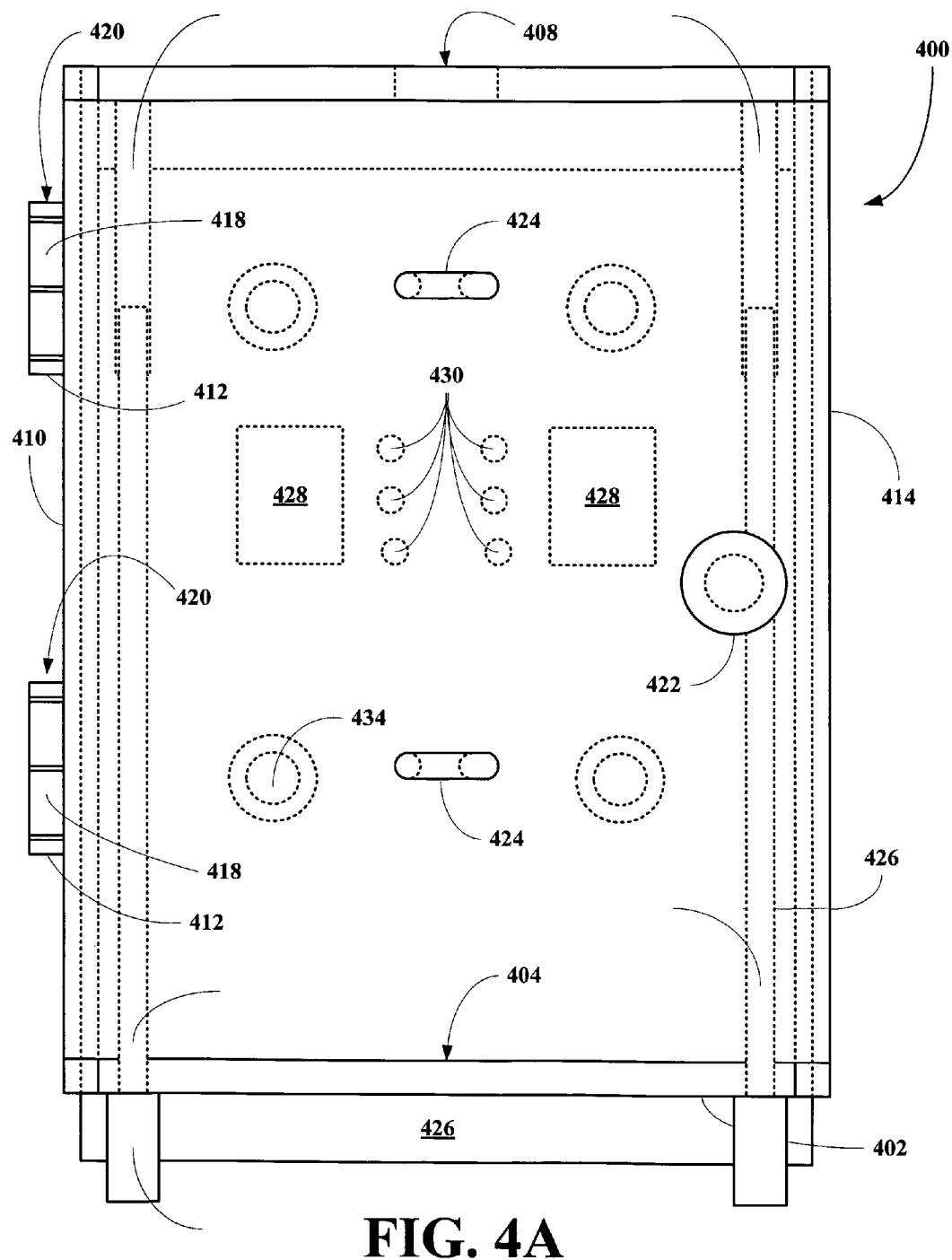
FIG. 4A–C depicts another preferred embodiment of an apparatus of this invention.
Figure 4B:
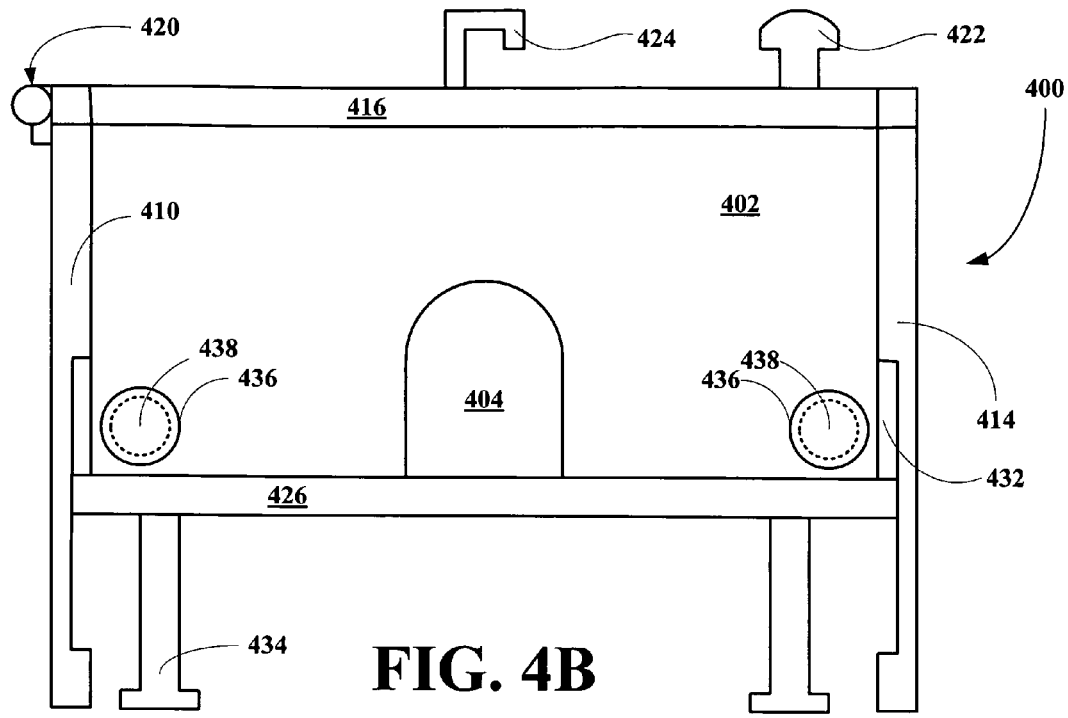
Figure 4C:
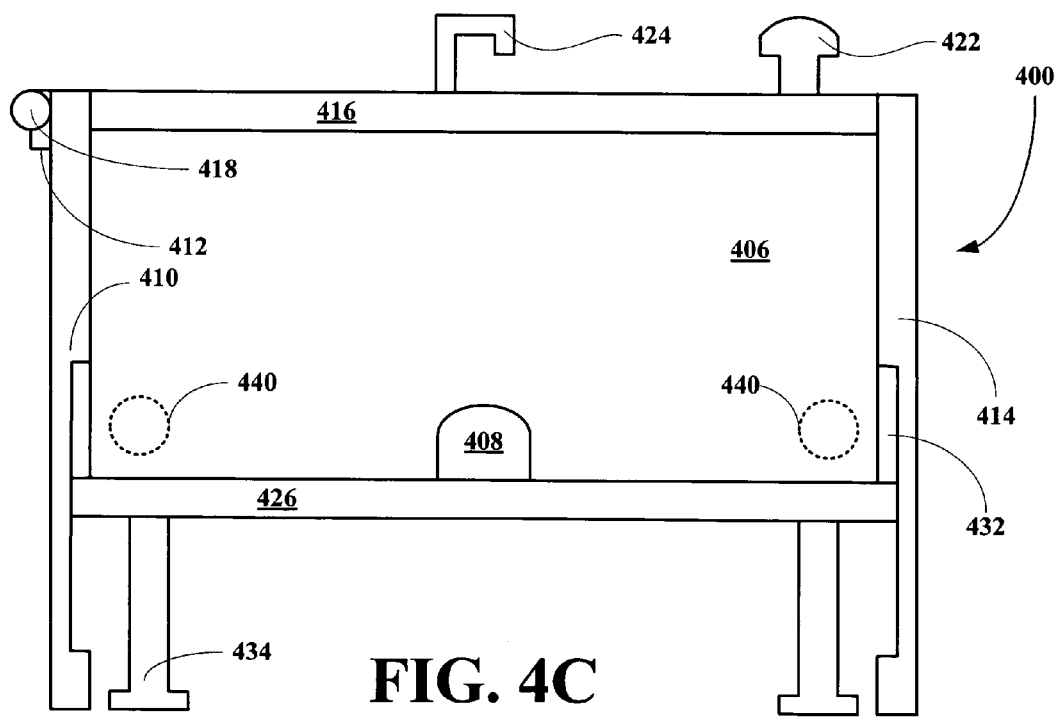

Referring now to FIG. 4A–C, a preferred embodiment of an animal restraint apparatus of this invention, generally 400, is shown to include a front panel 402 having a head aperture 404 and a back panel 406 having a tail aperture 408. The apparatus 400 also includes a left side panel 410 having first hinge members 412 and a right side panel 414. The apparatus 400 also includes a top panel 416 having second hinge members 418 adapted to mate with the first hinge member 112 to form hinge 420. The top panel 416 also includes an opener 422 and two hooks 424 adapted to hange the apparatus 400. The apparatus 400 also includes a bottom panel 426 having two hind leg apertures 428 and a plurality of abdominal apertures 430. The bottom panel 126 is designed to slidingly engage a vertical slot 432 in each of the side panels 410 and 414, where the bottom panel can be moved in and out to adjust the hind leg apertures 428. The bottom panel 426 is also designed to be moved up and down within the slot 432 via bottom panel vertical adjustment knobs 434. Moreover, the front panel 402 and the back panel 406 can slide vertically up and down to accommodate movement of the bottom panel 426 up and down as shown in FIGS. 4B&C. Furthermore, in this preferred embodiment, the apparatus 400 also includes a way to adjust a separation between the front panel 402 and the back panel 406. The front panel 402 and the back panel 406 are shorter than the side panels 410 and 414 and can be pushed or pulled in and out in a simple means of adjusting the separation between the front panel 402 and back panel 406. A more controlled means of adjusting this separation includes two shaft knobs 436 which turn two threaded shafts 438 which engage two threaded receivers 440. The threaded receivers 440 are affixed to the back panel 406 while the threaded shafts 438 extend out past the front panel 402 to the receivers 440. The knobs 436 are mounted onto the end of the shaft 438 extending beyond the front panel 402. By turning the knobs 436, the separation between the front panel 402 and the back panel 406 can be adjusted. The panels define an animal restraint cavity and the cavity's dimension is adjusted when the bottom panel is moved up and down and the front and/or back panels are moved in and out.

The apparatus of FIGS. 1A–C was used to measure spontaneous and evoked audible ultrasonic vocalizations of normal rats and arthritic rats. The arthritic rats had an arthritic kneejoint condition induced 6 to 8 hours previous to the vocalization studies during and after drug administration. The rats weighed between 20 and 350 grams. The drug was administered intracranially. The rats were first constrained in the apparatus and the apparatus adjusted to accommodate each rat. The apparatus allowed for stable conditions for mechanical stimulation of the arthritic knee joint and access to the head where a micro-dialysis probe was stereoaxically implanted into the brain (amygdala) of the rats for drug application. Audible and ultrasonic vocalizations were measure before, during and after drug applications.

All references cited herein are incorporated by reference. While this invention has been described fully and completely, it should be understood that, within the scope of the appended claims, the invention may be practiced otherwise than as specifically described. Although the invention has been disclosed with reference to its preferred embodiments, from reading this description those of skill in the art may appreciate changes and modification that may be made which do not depart from the scope and spirit of the invention as described above and claimed hereafter.

We claim:

1. An animal restraint apparatus comprising:
   two side members, each side member including an inwardly facing slot;
   a front member including a head aperture;
   a back member including a tail aperture;
   a bottom member including two hind leg apertures; and
   an openable top,
   where the members define an animal restraint cavity and the bottom member is adapted slide up and down and in and out within the slots and the front and back members are designed to move up and down with the bottom member changing a height of the cavity.

2. The apparatus of claim 1, wherein the tail aperture is adjustable.

3. The apparatus of claim 1, wherein the head aperture is adjustable.

4. The apparatus of claim 1, wherein the in and out movement of the bottom member adjusts a position of the hind leg apertures relative to the front member.

5. The apparatus of claim 1, wherein the bottom member further includes hind leg adjustment slots, where the slots are designed to change a size of the apertures.

6. The apparatus of claim 1, wherein the top member includes hooks mounted on a top surface thereof so that the apparatus can be hung.

7. The apparatus of claim 1, wherein the top member is pivotally mounted on one of the side members by a hinge.

8. The apparatus of claim 1, wherein the top member includes a knob for opening and closing the top member.

9. The apparatus of claim 1, wherein the top member includes a lid pivotally mounted on one of the side members.

10. The apparatus of claim 1, wherein the top member includes a lid pivotally mounted on one of the side members and the lid includes a knob for opening and closing the lid.

11. The apparatus of claim 1, wherein the front and back panels are moveable in and out to change a width of the cavity.

12. The apparatus of claim 1, further comprising a width adjusting assembly including two threaded receivers affixed to the back member and two threaded shafts, each shaft having a knob on one end, where the shafts are designed to threadingly engage the threaded receivers and where the assembly is adapted to change a width of the cavity.

13. An animal restraint apparatus comprising:
   a bottom assembly including:
      a bottom panel having two hind leg apertures;
      a first front panel having a head aperture;
      a first back panel having a tail aperture
   two side assemblies, each side assembly including:
      an inner side panel;
      an outer side panel; and
      a gap therebetween;
   a top assembly including:
      a second front panel adapted to slide inside the first front panel;
      a second back panel adapted to slide inside the first back panel;
      two side panels adapted to slide within the gaps;
      an openable top panel,
   where the top assembly is adapted to slide up and down relative to the bottom assembly to change a height of a cavity defined by the panels.

14. The apparatus of claim 13, wherein the tail aperture is adjustable.

15. The apparatus of claim 13, wherein the head aperture is adjustable.

16. The apparatus of claim 13, wherein the top assembly further includes two hooks for hanging the apparatus.

17. The apparatus of claim 13, wherein the top assembly further includes a lid having an opening knob with a locking device adapted to open and close the top and lock the top in its closed condition.

18. The apparatus of claim 13, wherein the lid is pivotally mounted to the top assembly by a hinge.

19. The apparatus of claim 13, wherein the bottom panel further includes hind leg adjustment slots, where the slots are designed to change a size of the apertures.

20. A method for constraining and testing an animal comprising the steps of:
   opening an animal restraining apparatus including:
      two side members, each side member including an inwardly facing slot;
      a front member including a head aperture;
      a back member including a tail aperture;
      a bottom member including two hind leg apertures; and
      an openable top,
   where the members define an animal restraint cavity and the bottom member is adapted slide up and down and in and out within the slots and the front and back members are designed to move up and down with the bottom member changing a height of the cavity;
   placing an animal within the cavity so that the animal's head extends through the head aperture, its tail extends through the tail aperture and its hind leg extend through the hing leg apertures,
   applying a physical stimulus, a chemical agent and/or a pharmacological agent to the animal via the exposed portions of the animal; and
   monitoring the animal's response to the stimulus or agent.

* * * * *